Patented Mar. 3, 1936

2,032,663

UNITED STATES PATENT OFFICE 2,032,663

LAMINATED GLASS AND PROCESS FOR PREPARING

Harry Trainor Neher, Bristol, Pa., assignor to Röhm & Haas Company, Philadelphia, Pa.

No Drawing. Application May 25, 1932, Serial No. 613,553

11 Claims. (Cl. 49—81)

This invention relates to laminated glass which is capable of showing under a wide variety of conditions an improvement over any laminated glass heretofore described.

An object of this invention is to produce a safety glass containing more than one film as intermediate layer, the extra film or films being selected to render the glass non-splintering at temperatures at which the original film tends to be brittle. A further object is to produce a laminated glass containing celluloid as intermediate layer, together with at least one additional film selected to extend the temperature range over which the glass will retain its non-splintering properties. A still further object of the invention is to prepare a safety glass containing more than one film, each such film comprising a polymer of polymerizable derivatives of acrylic and methacrylic acids or polymers of mixtures of such compounds, particularly polymers of the esters or mixed esters, and more especially a safety glass comprising two intermediate films, each a polymer of mixed esters of these acids, one selected as most suitable at ordinary temperatures, the other selected to extend the temperature range over which the glass will remain splinterless.

Further objects will appear hereinafter.

The plastic used in laminated glass by one of the first men in the field, Benedictus, was celluloid. Gelatin, from which substantially all the moisture is removed, has been used as a cement in connection with celluloid. Celluloid presents many disadvantages. No two batches are exactly alike and constant checkups must be made to insure uniformity. Although improvements have been made in it, it is still somewhat unsatisfactory. A temperature of 120° F. is the approximate limit up to which celluloid glass would give good service, and at about 60° F. and below the glass has a tendency toward brittleness.

On the other hand, various substitutes for celluloid have been proposed. Cellulose acetate will bear up well under temperatures up to the boiling point of water but has the disadvantage of a tendency toward brittleness, more haze, and greater cost. Laminations with regenerated cellulose are also very brittle.

Synthetic resins have been proposed but none have found commercial use. "Bakelite" and toluol-sulfonamide formaldehyde resins have been tried but so far as is now known have not been found practicable. Polymers of various unsaturated organic compounds have been suggested and itaconic acid esters have been tried as a cement.

All of the above have disadvantages, particularly unsuitability to variations in temperature. If they show up well at moderate or high temperatures they usually are detrimentally affected by low temperatures and vice versa.

This invention is designed to prepare a laminated glass to eliminate the defects of those now known in the art, one which will be unaffected by wide variation in temperature.

I have found that laminated glass of a much wider range of useful properties can be obtained by employing for the lamination a combination or multiple film, consisting of single films, each one of which is intentionally best suited for some one condition, although possibly falling short of other useful requirements. My invention would combine several such films so chosen that the less desirable characteristics of one film would be strengthened by one of the other films being especially strong in the property or properties in which the first was less desirable. By choosing the most suitable plastic or gum or resin and by suitably modifying it by blending with other plastics or gums or resins, or by properly plasticizing, or by regulating the properties in other suitable ways of manufacture, a set of films can be made so that combined in a lamination they will show properties which are most desirable in a laminated glass.

I have found, for example, that among the esters of acrylic acid and its higher homologues the larger the alcohol group becomes, the softer is the polymerized ester. This discovery, together with the fact that these polymerized derivatives of acrylic acid and its higher homologues have properties which render them suitable for use in the preparation of laminated glass, makes it possible to produce a novel laminated glass by using, together with films now employed, a film selected from those prepared from polymers of these esters which will supplement the properties of the first film and give a glass which will hold up under wide variation in temperature.

In the acrylate and methacrylate series in general, the softness of the polymer increases as the alcohol group of the ester increases in size. But polymers from esters containing an iso-group in the alcohol residue are harder than those from the corresponding n-alcohol group, i. e. poly isopropyl acrylate is harder than poly n-propyl acrylate and about equal to poly ethyl acrylate. The softness or hardness of the polymers of the two series overlaps each other in that poly methyl acrylate and poly n-amyl α-methacrylate are of approximately the same degree of softness. Therefore, the hardest polymer of these two series is methyl α-methacrylate. The softness is limited only by the size of the alcohol groups available.

In selecting a second film to be used with celluloid which is brittle at low temperature, should be chosen one which is tough at low temperatures. One of the acrylates should be chosen since these are softer at ordinary temperatures than the methacrylates. In a similar manner, knowing the properties of the first film, a second, and if desired, a third film could thus be selected to supply the properties in which the first is deficient.

If it were desired to make a glass which would bear up under high temperatures one of the methacrylates would be chosen, according to the temperature range expected of the second film. The second film would thus give the glass serviceability over a wider range of temperatures and would not in any way render the glass less efficient, but would make it stronger and more durable at higher temperature.

The films employed in such a glass need not be those obtained from the polymerization of single compounds but can be obtained from the polymerization together of two or more of such compounds. For example a larger proportion of methyl α-methacrylate is polymerized in an appropriate manner with a smaller proportion of ethyl acrylate. This film is tough and strong at room temperatures and above and combines the adhesiveness of the acrylates with the toughness of the methacrylates. However, it is brittle at lower temperatures because of the preponderance in it of the methyl α methacrylate. Accordingly a second film is prepared by polymerizing together methacrylate and ethyl α methyl acrylate with the proportion of the acrylate being the larger. This film, while soft at room temperatures is very tough and strong at lower temperatures and when used with the film above gives a very good, durable laminated glass, capable of standing up against fairly wide temperature changes. This second film could be used to good advantage with celluloid and would give the laminated glass toughness and strength at low temperatures which celluloid does not give it.

It is apparent, of course, that the first film employed can be of any of those suitable for laminated glass, such as celluloid, polymerized esters of acrylic acid and higher homologues and derivatives, polymerized vinyl compounds such as vinyl acetate, itaconic acid esters and the like. Knowing the properties of the first film it is possible by the above described method to prepare a second film to be used. Likewise supplementary films i. e. the second and the third films etc. may be any of the above or polymerization products of mixtures etc. Of course their selection depends upon the properties of the first film. The supplementary film may be the polymer of a single compound selected as above indicated from the derivative of acrylic acid and its homologues or it may be the polymer of a mixture. If it is desired, for instance, to use vinyl acetate in the second film it can be polymerized together with a suitable acrylate or α methacrylate to give the properties necessary to supplement those of the first film.

Polystyrenes, like methacrylic acid derivatives, tend to give polymers which are hard at ordinary temperatures. Indenes are also in this class. On the other hand vinyl acetate and methyl vinyl ketone are in the class of the acrylic acid derivatives for the purpose of softness of the polymers.

This invention covers the use, in a multiple film glass, of a film prepared from polymers of a mixture of any of such materials and also the use of a polymer of a single compound which has been selected to supplement the properties of the other film or films and to extend the temperature range through which the glass will remain tough and durable. A modification of this process by which is produced a particularly good durable glass is described in Example 1 below. Two layers of the second film are used, one on each side of the celluloid with a resulting gain in compactness since the second film is more adhesive to glass and celluloid than celluloid is to glass.

In preparing the glass the films are ordinarily made beforehand and affixed in a suitable manner. Instead of this, however, the materials can be partially polymerized beforehand and the polymerization completed in situ. It is apparent, of course, that it would be difficult to handle freely flowing monomers so as to polymerize them in situ between the glass sheets so that it is usually necessary to partially polymerize them beforehand to give them some body. Where the first film is a material such as celluloid, or a material which has already been polymerized or partially polymerized, the polymerization of the second film in situ is more easily accomplished.

Any polymerizing influence can be used including light, heat, pressure etc. Plasticizers, pigments, solvents may be used if desired.

The following examples will serve to illustrate the invention.

*Example 1*

Two pieces of glass are each coated with a solution of resin of the following composition: 25 parts of ethyl α methacrylate and 75 parts of methyl acrylate which have been polymerized together in ethylene dichloride. The films so produced may be cooled to about 20° F. without showing any brittleness. After allowing the solvent to evaporate, they are sprayed lightly with a high boiling solvent or plasticizer, in this case dibutyl phthalate, and a sheet of nitrocellulose is laid on top of the one film, while the other glass with its film covers the other side of the nitrocellulose film. The "sandwich" is then put into a heated hydraulic press and pressed for ten minutes at a temperature of 245° F. and 70# per square inch between layers of absorbent paper in the well-known manner. The resultant laminated glass shows shatterproofness not only at ordinary temperatures but also at a temperature of approximately 20° F., because at low temperatures, the acrylate films strengthen the brittle nitrocellulose film.

*Example 2*

One piece of glass is coated with an ethylacetate solution of a resin made by polymerizing together 80 parts of methyl α methacrylate and 20 parts of ethyl acrylate. Such a film is tough and strong at room temperatures and above, but quite brittle at temperatures below about 60° F. Another piece of glass of the same dimensions is coated with a solution of 60 parts methyl acrylate and 40 parts of ethyl α-methacrylate polymerized together in benzene. This film is too soft at room temperatures, but still very tough and strong at about 20° F. These coatings are gently heated to drive off the solvents, and when dry, plasticizer is applied as in Example 1, then the glass plates are superimposed film to film and pressed in the manner described above. The resultant safety glass shows very good resistance to shattering within a range much wider than either one of the two films alone.

Of course, such a combination of films can be utilized in many ways, and many modifications may be made in the nature of the gums or resins or plastics, the temperature ranges, number of films combined, and in the process of lamination, all within the scope of my invention.

Example 3

The process of this example is the same as Example 1 except that the supplementary film is prepared from 35 parts of ethyl α methacrylate and 65 parts of ethyl acrylate polymerized together in ethylene dichloride. This film has about the same properties as the one used in Example 1, the increase in proportion of the embrittling α methacrylate being offset by the use of ethyl acrylate which has a greater tendency toward softening the polymer than methyl acrylate.

Example 4

The process is carried out as described in Example 2 but with films made as follows: 75 parts of ethyl α methacrylate and 25 parts of methyl acrylate are polymerized together and their film is used with the product obtained by polymerizing together 50 parts of ethyl acrylate and 50 parts of ethyl α methacrylate.

In the above examples it is apparent that most of the ordinary organic solvents can be used, such as:

Benzene, toluene, xylene, chlorobenzene, ethylene dichloride, chloroform, carbon tetrachloride, ethyl acetate, methyl acetate, methyl formate, acetone, ethers, no particular solvent being necessary and none claimed as part of the invention. Likewise, suitable plasticizers will suggest themselves to anyone versed in the art. These will include among others:

Dibutyl phthalate, diethyl phthalate, dibutyl tartrate, diethyl tartrate, halowax oil, tricresyl phosphate, butyl carbitol, butyl cellosolve, butyl stearate, diethyl malonate, diethyl succinate, diphenyl carbonate, methyl hexyl carbinol, benzoyl benzoate.

It is apparent that in the above examples instead of the films used others can be selected to make the resulting glass durable over wide temperature ranges by following the methods described above. In place any of the above films one might use products obtained by polymerizing together for instance, vinyl preferably methacrylate; acrylic esters and itaconic esters acetate and acrylic esters, preferably ethyl α methacrylate and diethyl itaconate; vinyl ketones and acrylic esters, preferably, methyl vinyl ketone and ethyl α methacrylate, styrenes and acrylates, preferably styrene and ethyl α methacrylate; cyclopentadiene and indene; cinnamic esters and acrylic esters, preferably ethyl cinnamate and ethyl alpha methacrylate; indene and acrylates, preferably indene and ethyl alpha methacrylate.

It is understood, of course, that the above examples are merely illustrative and that the invention is not confined to any particular films, methods of operation, temperatures, pressures, etc. since anyone versed in the art will recognize that wide variations are possible in all these factors without departing from the spirit of the invention the scope of which is limited only by the following claims.

What I claim is:

1. A laminated glass comprising two sheets of glass firmly united by a transparent composite reinforcing sheet, said composite sheet comprising three layers of reinforcing material, the central layer having a degree of hardness different from that of the outer layers, said composite sheet comprising a central layer of celluloid and two outer layers of the joint polymerization product of an ester of acrylic acid and an ester of methacrylic acid, said laminated glass being shock resistant at low and at relatively high temperatures.

2. A laminated glass comprising two sheets of glass firmly united by a transparent composite reinforcing sheet, said composite sheet comprising three layers of reinforcing material, the central layer having a degree of hardness different from that of the outer layers, said composite sheet comprising a central layer of celluloid and two outer layers of the joint polymerization product of one of the group consisting of ethyl and methyl acrylates, and of one of the group consisting of ethyl and methyl methacrylates, said laminated glass being shock resistant at low and at relatively high temperatures.

3. A laminated glass comprising two sheets of glass firmly united by a transparent, composite reinforcing sheet, said composite sheet consisting of two layers of reinforcing material each layer being a polymerization product of an ester of one of the group consisting of acrylic and methacrylic acids, the two layers having different degrees of hardness at any given temperature, said laminated glass being shock resistant at low and at relatively high temperatures.

4. A laminated glass comprising two sheets of glass firmly united by a transparent, composite reinforcing sheet, said composite sheet consisting of two layers of reinforcing material having different degrees of hardness at any given temperature, each layer being a joint polymerization product of at least two esters of one of the group consisting of acrylic and methacrylic acids, the composition of the layers being adjusted so as to impart a different degree of hardness to each layer, said laminated glass being shock resistant at low and at relatively high temperatures.

5. A laminated glass comprising two sheets of glass firmly united by a transparent, composite reinforcing sheet, said composite sheet comprising two layers of reinforcing material having different degrees of hardness at any given temperature, each layer comprising a joint polymerization product of an ester of acrylic acid and an ester of methacrylic acid, the composition of the layers being adjusted so as to impart a different degree of hardness to each layer, said laminated glass being shock resistant at low and at relatively high temperatures.

6. A laminated glass comprising two sheets of glass firmly united by a transparent, composite reinforcing sheet, said composite sheet comprising two layers of reinforcing material having different degrees of hardness at any given temperature, each layer comprising a joint polymerization product of one of the group consisting of ethyl and methyl acrylates and one of the group consisting of ethyl and methyl methacrylates, the composition of the layers being adjusted so as to impart a different degree of hardness to each layer, said laminated glass being shock resistant at low and at relatively high temperatures.

7. A laminated glass comprising two sheets of glass firmly united by a transparent, composite reinforcing sheet, said composite sheet comprising two layers of reinforcing material, one comprising the joint polymerization product of substantially 80 parts of methyl methacrylate and substantially 20 parts of ethyl acrylate and the other comprising the joint polymerization product of substantially 60 parts of methyl acrylate and substantially 40 parts of ethyl methacrylate.

8. In the process of making laminated glass which is shock resistant at low and at relatively high temperatures, the step comprising uniting two sheets of glass by means of a composite reinforcing sheet, said sheet comprising a central layer of celluloid and two supplementary reinforcing layers of a joint polymerization product of an ester of acrylic acid and an ester of methacrylic acid.

9. In the process of making laminated glass which is shock resistant at low and at relatively high temperatures, the steps of applying to one sheet of glass a reinforcing layer comprising a polymerized ester of one of the group consisting of acrylic and methacrylic acids, applying to a second sheet a second polymerized ester of the same group of acids, said polymerized esters being of different degrees of hardness, and directly uniting the coated sheets of glass by heat and pressure.

10. In the process of making laminated glass which is shock resistant at low and at relatively high temperatures, the step of applying to one sheet of glass a reinforcing layer comprising the joint polymerization product of at least two esters of the group consisting of acrylic and methacrylic acids, applying to a second sheet of glass a reinforcing layer of similar composition having different degree of hardness and directly uniting the two glass sheets by heat and pressure.

11. In the process of making laminated glass which is shock resistant at low and at relatively high temperatures, the steps comprising applying to one sheet of glass a reinforcing layer comprising the joint polymerization product of substantially 80 parts of methyl methacrylate and substantially 20 parts of ethylacrylate, applying a second sheet of glass a reinforcing layer comprising the joint polymerization product of substantially 60 parts of methyl acrylate and substantially 40 parts of ethyl methacrylate, and uniting the two glass sheets by heat and pressure.

HARRY T. NEHER.

Certificate of Correction

Patent No. 2,032,663. March 3, 1936.

HARRY TRAINOR NEHER

It is hereby certified that errors appear in the printed specification of the above numbered patent requiring correction as follows: Page 2, first column, line 41, for "methacrylate and ethyl a methyl acrylate" read *methylacrylate and ethyl a-methacrylate*; page 3, first column, lines 59, 60, and 61 strike out the words "preferably methacrylate; acrylic esters and itaconic esters acetate and acrylic esters, preferably ethyl a methacrylate" and insert instead *acetate and acrylic ester preferably methylacrylate; acrylic esters and itaconic esters preferably ethyl a-methacrylate*; and that the said Letters Patent should be read with these corrections therein that the same may conform to the record of the case in the Patent Office.

Signed and sealed this 28th day of April, A. D. 1936.

[SEAL]

LESLIE FRAZER,
*Acting Commissioner of Patents.*